United States Patent
Chen et al.

(10) Patent No.: US 7,150,557 B2
(45) Date of Patent: Dec. 19, 2006

(54) BACK LIGHT MODULE FOR USE IN A DUAL-SIDED DISPLAY

(75) Inventors: Chun-Yuan Chen, Kao-Hsiung Hsien (TW); Hui-Kai Chou, Taipei (TW)

(73) Assignee: AU Optronics Corp, Hsin-Chu (TW)

( * ) Notice: Subject to any disclaimer, the term of this patent is extended or adjusted under 35 U.S.C. 154(b) by 70 days.

(21) Appl. No.: 10/710,690

(22) Filed: Jul. 28, 2004

(65) Prior Publication Data

US 2006/0007706 A1    Jan. 12, 2006

(30) Foreign Application Priority Data

Jul. 6, 2004    (TW)    ............... 93120245 A (51) Int. Cl.
*F21V 7/04*    (2006.01)

(52) U.S. Cl. ........................ 362/614; 349/70
(58) Field of Classification Search ................ 362/614, 362/97, 260; 349/70, 71
See application file for complete search history.

(56) References Cited

U.S. PATENT DOCUMENTS

| 4,920,298 | A | * | 4/1990 | Hinotani et al. ............ 313/493 |
| 5,648,858 | A | * | 7/1997 | Shibata et al. ................ 349/57 |
| 6,853,124 | B1 | * | 2/2005 | Vollkommer et al. ....... 313/485 |
| 2001/0055077 | A1 | | 12/2001 | Kashima |
| 2002/0064037 | A1 | * | 5/2002 | Lee ............................. 362/31 |
| 2002/0089839 | A1 | | 7/2002 | Chien et al. |
| 2002/0097496 | A1 | | 7/2002 | Lu |
| 2003/0031031 | A1 | | 2/2003 | Tiao et al. |
| 2003/0098840 | A1 | | 5/2003 | Nagatani |
| 2003/0100935 | A1 | | 5/2003 | Kratz |
| 2003/0174318 | A1 | | 9/2003 | Quist |
| 2004/0232853 | A1 | * | 11/2004 | Hur et al. .................... 315/291 |
| 2005/0127848 | A1 | * | 6/2005 | Park et al. ............... 315/209 R |

FOREIGN PATENT DOCUMENTS

| CN | 1412814 A | 4/2003 |
| CN | 1458547 A | 11/2003 |
| JP | 2000-338483 | 12/2000 |

* cited by examiner

*Primary Examiner*—Renee Luebke
*Assistant Examiner*—Julie A. Shallenberger
(74) *Attorney, Agent, or Firm*—Winston Hsu (57) ABSTRACT

A back light module adopted for use in a dual panel display includes a plurality of external electrode fluorescent lamps (EEFLs) positioned between two liquid crystal display panels. Each EEFL has a first electrode and a second electrode, and the first electrodes and the second electrodes are respectively electrically connected in parallel.

8 Claims, 8 Drawing Sheets

BACK LIGHT MODULE FOR USE IN A DUAL-SIDED DISPLAY

BACKGROUND OF INVENTION

1. Field of the Invention

The present invention relates to a back light module adopted for use in a dual-sided display, and more particularly, to a back light module having a simplified structure.

2. Description of the Prior Art

With the development of liquid crystal display (LCD) technologies, LCD display panels have been widely applied to various consumer electronic products such as digital cameras, personal digital assistants, mobile phones, and flat TVs. A back light module, a key component in an LCD display, is installed in the back side of an LCD display panel for providing the LCD display panel with light.

The back light module substantially includes a plurality of cold cathode fluorescent lamps (CCFL) arranged in parallel, and a combination of various optical components such as diffusion plates and prisms for providing the LCD display panel with a brilliant and even light source. Cold cathode fluorescent lamps have to be driven by a high AC voltage, and moreover, they have to be respectively driven by different inverters. If an inverter is used to drive a plurality of cold cathode fluorescent lamps, the ballast of the inverter cannot be maintained stable, which results in an uneven brightness of the cold cathode fluorescent lamps. As a result, each cold cathode fluorescent lamp requires independent conducting wires to connect to an inverter, and this limitation increases the difficulty in allocating internal components and in housing design of the LCD. For a single panel LCD, the inverters and the conducting wires can be hidden under the reflecting plate or the rear frame of the back light module without influencing the illumination of the back light module.

However, for a dual-sided display, the allocation of the inverters and the conducting wires becomes a problem to be solved. The dual-sided display is composed of two parallel LCD display panels, and a back light module installed in between the LCD display panels. Therefore the back light module has to be open on both sides and a reflecting plate is not allowed. In such a case, the inverters and the conducting wires cannot be arranged under the reflecting plate, and have to be installed somewhere inside the back light module without influencing the illumination of the back light module. Generally, the conducting wires are positioned in the peripheral region of the display, nevertheless, this region is originally designed for other components, such as driving circuits of the display. In addition, since each cold cathode fluorescent lamp requires an inverter, the allocation of the internal components for the dual-sided display becomes more difficult.

Figure 1:
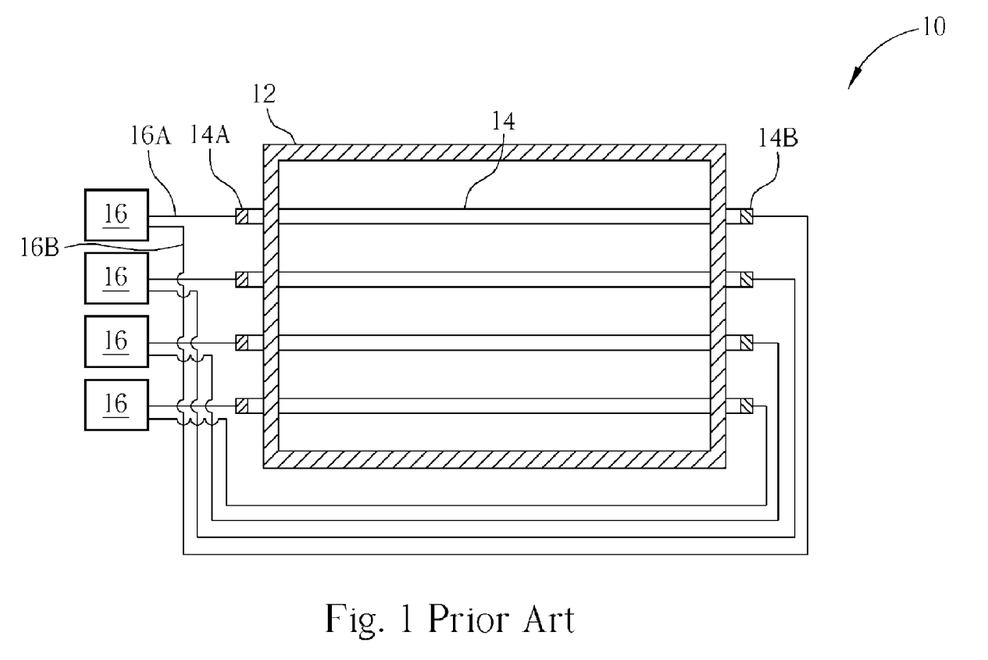
FIG. 1 is a top view of a conventional back light module for use in a dual-sided display.
Figure 2:
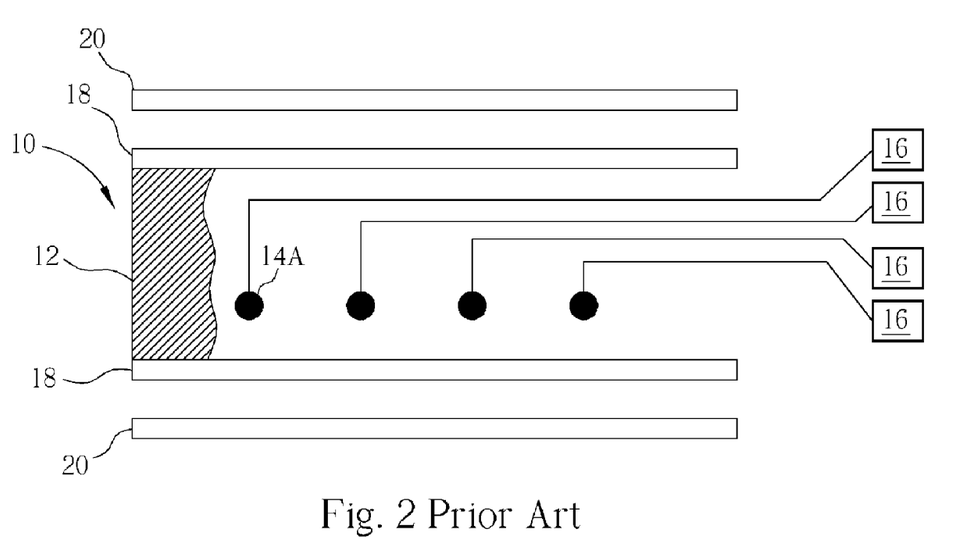
FIG. 2 is a cross-sectional view of the back light module shown in FIG. 1.

Please refer to FIG. 1 and FIG. 2. FIG. 1 is a top view of a conventional back light module 10 for use in a dual-sided display, and FIG. 2 is a cross-sectional view of the back light module 10 shown in FIG. 1. As shown in FIG. 1 and FIG. 2, the back light module 10 is positioned between parallel LCD display panels 20 for providing a light source for both of the LCD display panels 20. The back light module 10 includes a frame 12, and a plurality of cold cathode fluorescent lamps 14 (CCFL) fixed in the frame 12. Each cold cathode fluorescent lamp 14 includes two electrodes 14A and 14B exposed outside the frame 12. In addition, the back light module 10 further includes a plurality of inverters 16 corresponding to the cold cathode fluorescent lamps 14 for converting DC voltage into AC voltage. Each inverter 16 has two conducting wires 16A and 16B respectively connected to the electrodes 14A and 14B so as to provide the cold cathode fluorescent lamps 14 with proper driving voltages. Furthermore, the back light module 10 usually includes two diffusion plates 18, each positioned between the cold cathode fluorescent lamps 14 and the respective LCD display panel 20 for scattering the light beams irradiated by the cold cathode fluorescent lamps 14.

As described, for the conventional back light module 10, the same amount of inverters 16 as cold cathode fluorescent lamps 14 has to be installed to provide corresponding driving voltages. This increase in inverters means an increase in cost. Besides, redesigns for extra space for allocating the inverters 16 and the conducting wires 16A and 16B conflict with dimensional requirements of a small size display. In addition, the inverters 16 are high frequency components, and therefore an increase in the amount of inverters 16 generates increased electromagnetic interference.

Therefore, any reduction in quantity of inverters for a dual-sided display would result in a more flexible design and effectively economize cost.

SUMMARY OF INVENTION

It is therefore a primary objective of the present invention to provide a back light module having a simplified structure for solving the aforementioned problems.

According to a preferred embodiment of the present invention, a back light module adopted for use in a dualsided display having two parallel LCD display panels is provided. The back light module includes a plurality of external electrode fluorescent lamps (EEFLs) positioned between the two LCD display panels. Each external electrode fluorescent lamp includes a first electrode and a second electrode. The first electrodes and the second electrodes are electrically connected in parallel separately.

According to a preferred embodiment of the present invention, a back light module adopted for use in a dual-sided display having two parallel LCD display panels is provided. The back light module includes a flat fluorescent lamp positioned between the two LCD display panels, where the flat fluorescent lamp is double-faced light source.

Since the back light module of the present invention utilizes external electrode fluorescent lamps or a flat fluorescent lamp, which can be driven by a single inverter, to replace cold cathode fluorescent lamps as the light source of the dual display, the amounts of the inverters and conducting wires are reduced. This reduces the cost and avoids difficulty in designing dual-sided displays.

These and other objectives of the present invention will no doubt become obvious to those of ordinary skill in the art after having read the following detailed description of the preferred embodiment that is illustrated in the various figures and drawings.

DETAILED DESCRIPTION

Figure 3:
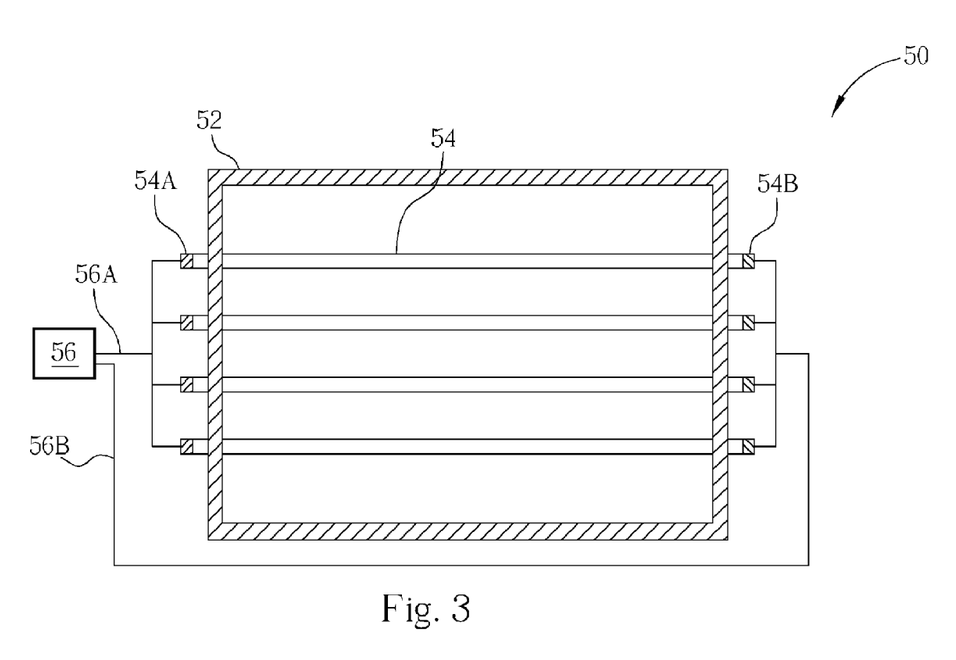
FIG. 3 is a top view of a back light module according to a first preferred embodiment of the present invention
Figure 4:
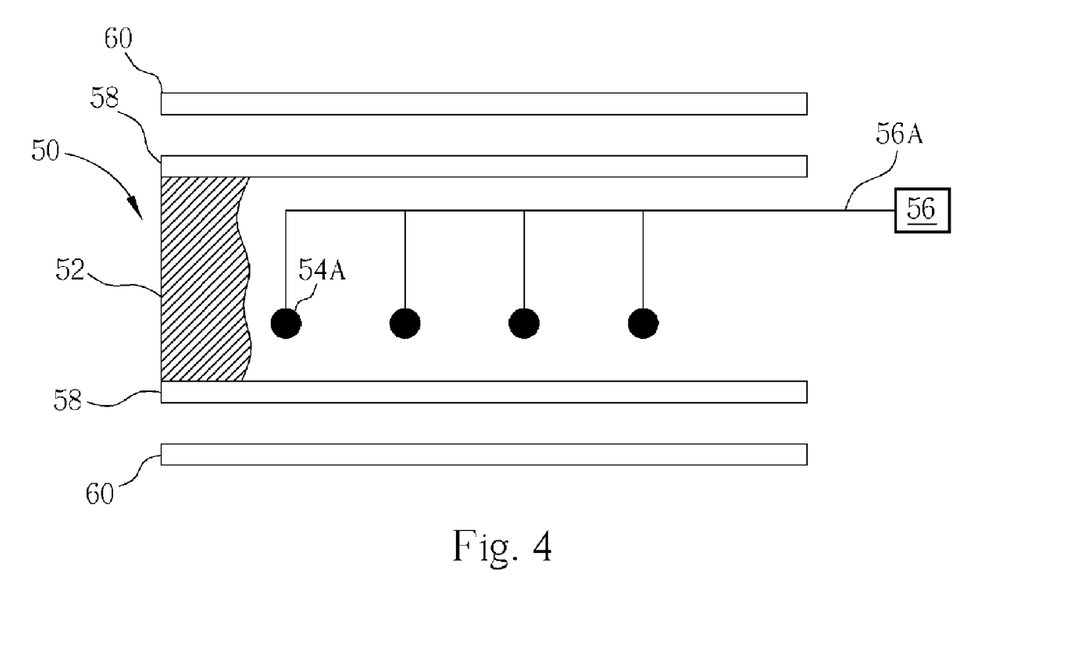
FIG. 4 is a cross-sectional view of the back light module shown in FIG. 3.

Please refer to FIG. 3 and FIG. 4. FIG. 3 is a top view of a back light module 50 according to a first preferred embodiment of the present invention, and FIG. 4 is a cross-sectional view of the back light module 50 shown in FIG. 3. As shown in FIG. 3 and FIG. 4, the back light module 50 is installed in between two parallel LCD display panels 60 for providing a light source for both of the LCD display panels 60. The back light module 50 includes a frame 52, and a plurality of external electrode fluorescent lamps (EEFLs) 54 fixed to the frame 52. Each external electrode fluorescent lamp 54 includes two electrodes 54A and 54B exposed outside the frame 52. In addition, the back light module 50 further includes an inverter 56 electrically connected to the electrodes 54A and 54B of the external electrode fluorescent lamps 54 through two conducting wires 56A and 56B so as to provide the external electrode fluorescent lamps 54 with proper driving voltages. It is noted that each external electrode fluorescent lamp 54 has an independent ballast (not shown), and thus all the external electrode fluorescent lamps 54 can be driven via the inverter 56. The back light module 50 further includes two diffusion plates 58 respectively positioned between the external electrode fluorescent lamps 54 and the two LCD display panels 60 for scattering light generated by the external electrode fluorescent lamps 54. In addition, other optical components, such as prisms and brightness enhancing films, can be installed in the back light module 50 where necessary.

As shown in FIG. 3 and FIG. 4, since the back light module 50 utilizes the external electrode fluorescent lamps 54 as a light source, and has a single inverter 56 to drive the external electrode fluorescent lamps 54, the electrodes 54A and 54B can be respectively connected to the conducting wires 56A and 56B of the inverter 56 in a parallel manner. Accordingly, the amounts of conductive wires are reduced. In this embodiment, the electrode 54A of each external electrode fluorescent lamp 54 is connected in parallel to the conducting wire 56A through a conducting wire, and the electrode 54B (not shown) of each external electrode fluorescent lamp 54 is connected in parallel to the conducting wire 56B (not shown) through a conducting wire, so that the external electrode fluorescent lamps 54 can obtain an AC voltage from the inverter 56. It is noted that the external electrode fluorescent lamps 54 are driven by the inverter 56 in a floating manner, which means the two electrodes 54A and 54B are driven by voltages out of phase. For example, if the driving voltage of the external electrode fluorescent lamps 54 is 1 KV, the floating driving method means the electrodes 54A and 54B are respectively provided with a +0.5 KV and a −0.5 KV AC voltage.

Figure 5:
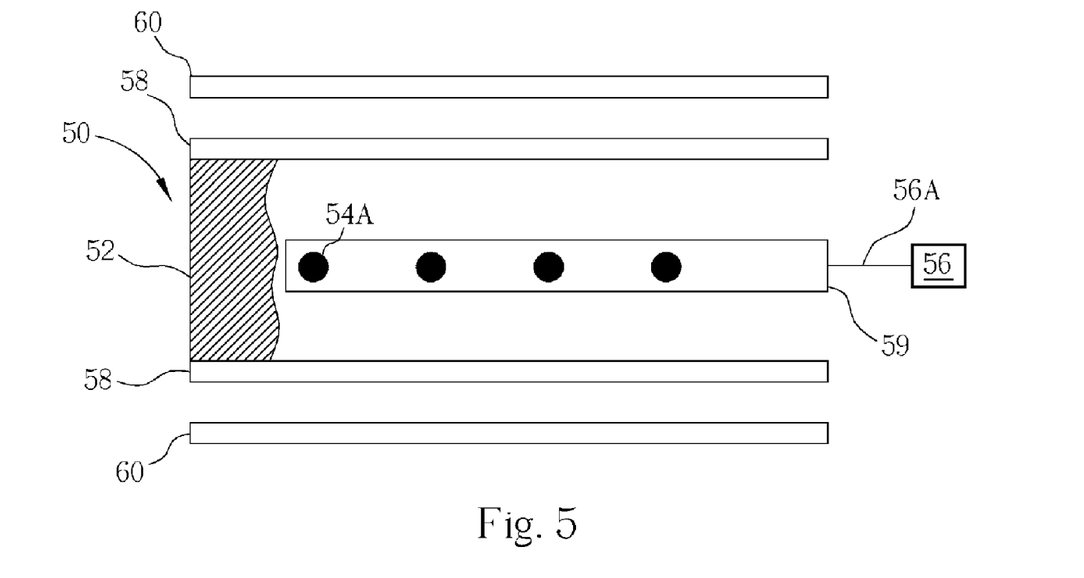
FIG. 5 is a schematic diagram illustrating another connection method of the electrodes.

The external electrode fluorescent lamps 54 can also be connected in another parallel manner. Please refer to FIG. 5, which is a schematic diagram illustrating another connection method of the electrodes 54A. As shown in FIG. 5, the electrodes 54A are connected in parallel with a metal electrode 59. In practice, the electrodes 54A (or 54B) can be connected in either way illustrated in FIG. 4 or FIG. 5.

As described, since the back light module 50 utilizes the external electrode fluorescent lamps 54 as a light source, only an inverter 56 is required. Accordingly, the electrodes 54A and 54B respectively require a conducting wire or a metal electrode 59 to connect to the conducting wires 56A and 56B. Consequently, the amounts of inverters 56 and conducting wires are reduced.

Figure 6:
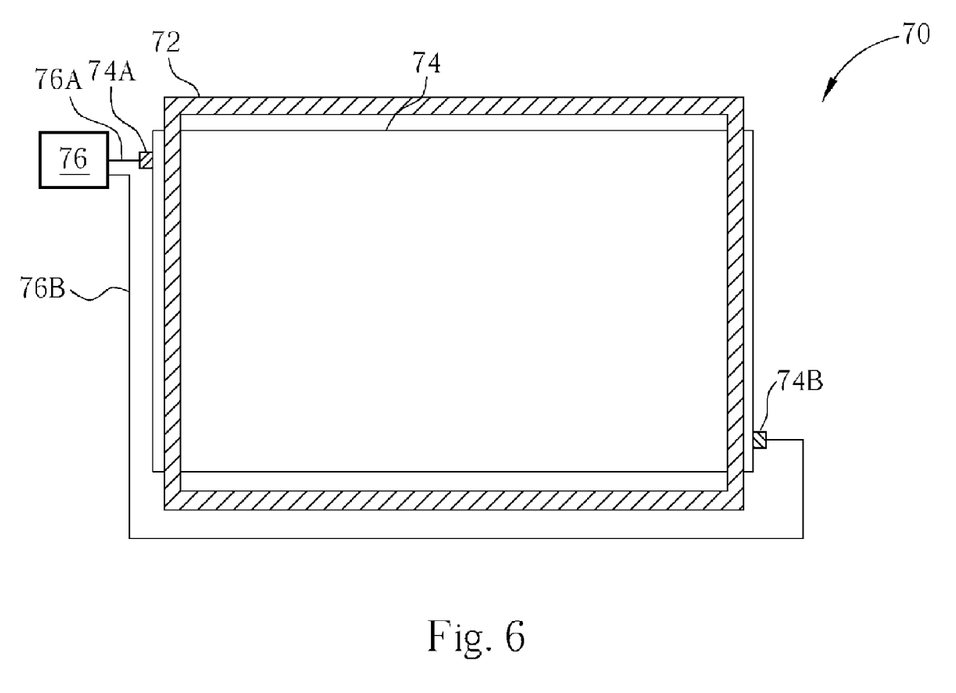
FIG. 6 is a top view of a back light module according to a second preferred embodiment of the present invention.
Figure 7:
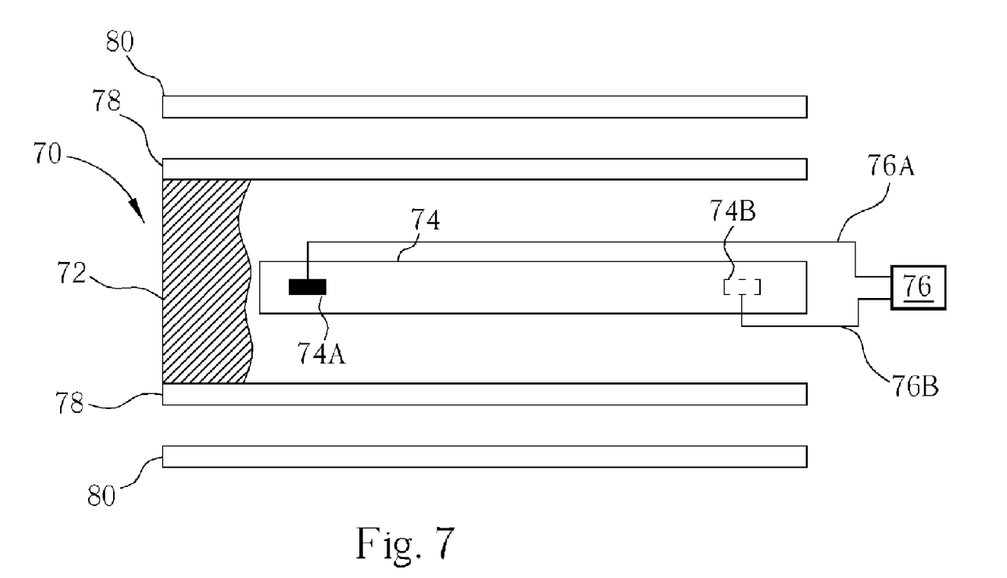
FIG. 7 is a cross-sectional view of the back light module shown in FIG. 6.

Please refer to FIG. 6 and FIG. 7. FIG. 6 is a top view of a back light module 70 according to a second preferred embodiment of the present invention, and FIG. 7 is a cross-sectional view of the back light module 70 shown in FIG. 6. As shown in FIG. 6 and FIG. 7, the back light module 70 is installed between two parallel LCD display panels 80 for providing a light source for both of the LCD display panels 80. The back light module 70 includes a frame 72, and a double-faced luminous flat fluorescent lamp 74 fixed to the frame 72. The flat fluorescent lamp 74 includes two electrodes 74A and 74B. The back light module 70 further includes an inverter 76 connected to the electrodes 74A and 74B of the flat fluorescent lamp 74 through two conducting wires 76A and 76B so as to drive the flat fluorescent lamp 74. The back light module 70 further includes two diffusion plates 78 respectively installed between the flat fluorescent lamp 74 and the two LCD display panels 80 for providing even illumination. In addition, other optical components, such as prisms and brightness enhancing films, can be installed in the back light module 50.

Figure 8:
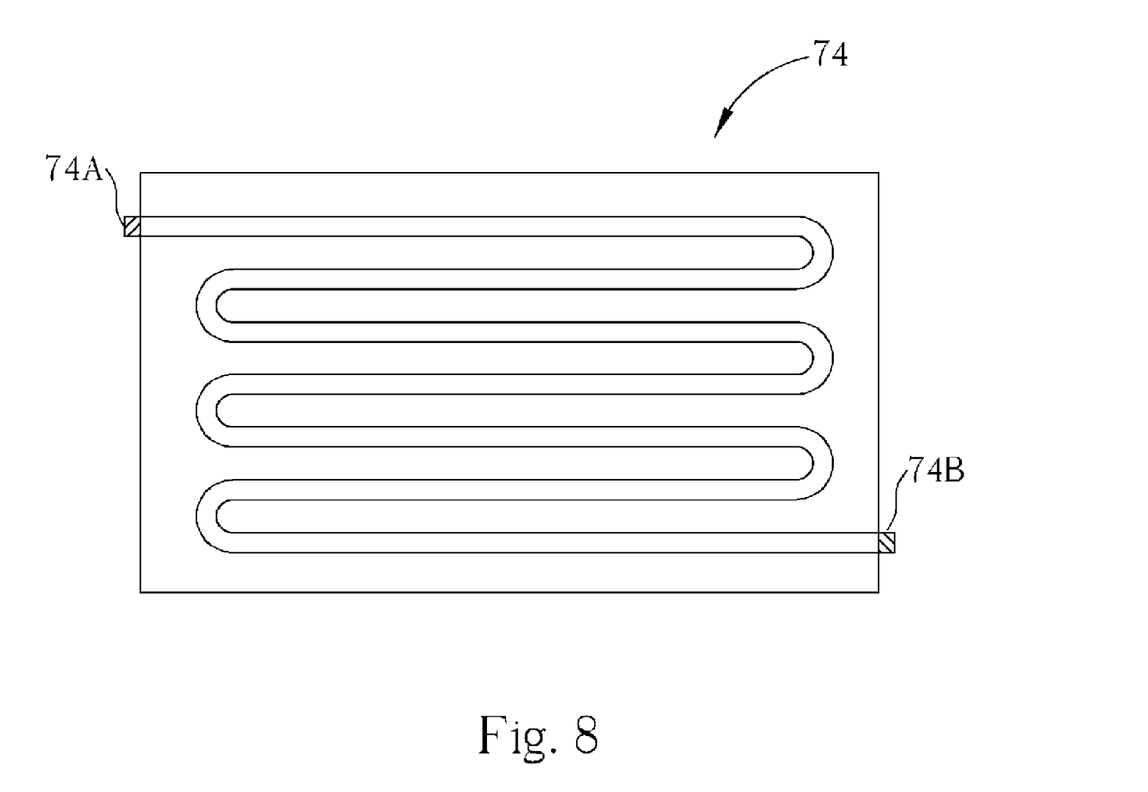
FIG. 8 is a top view of a flat fluorescent lamp.

The flat fluorescent lamp 74 is implemented by various fluorescent lamps having a curved or a zigzag structure. Please refer to FIG. 8, which is a perspective view of the flat fluorescent lamp 74. As shown in FIG. 8, the flat fluorescent lamp 74 is composed of a fluorescent lamp having a zigzag structure, and connected to the inverter (not shown) through the electrodes 74A and 74B. In addition, the flat fluorescent lamp 74 can be incorporated with a scattering plate (not shown) to improve light uniformity.

It can be seen that the back light module 70 with a flat fluorescent lamp 74 installed is as efficient as several cold cathode fluorescent lamps. Consequently, the back light module 70 only requires a single inverter 76 to drive the flat fluorescent lamp 74, and therefore reduce the quantities of the inverter 76 and the conducting wires.

In comparison with the prior art, the back light module according to the present invention effectively reduces the amounts of inverters and conducting wires. As a result, the problems of allocating the inverters and conducting wires are solved, and the cost is accordingly reduced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A back light module for use in a dual-sided display having two parallel liquid crystal display (LCD) panels, the back light module comprising:
   a frame; and
   a plurality of external electrode fluorescent lamps (EEFLs) positioned between the two LCD display panels and fixed to the frame, each external electrode fluorescent lamp comprising a first electrode and a second electrode, the first electrodes being electrically connected in parallel, and the second electrodes being electrically connected in parallel;
   wherein the first electrodes and the second electrodes are exposed outside the frame.

2. The back light module of claim 1, wherein the first electrodes and the second electrodes are electrically connected to an inverter that supplies an AC voltage.

3. The back light module of claim 2, wherein the inverter drives the external electrode fluorescent lamps in a floating manner.

4. The back light module of claim 1, wherein the first electrodes and the second electrodes are respectively connected to a metal electrode.

5. The back light module of claim 4, wherein the metal electrode is a conducting wire.

6. The back light module of claim 1, further comprising two diffusion plates respectively positioned between the two LCD display panels and the external electrode fluorescent lamps.

7. The back light module of claim 1, further comprising a diffusion plate positioned between one of the LCD display panels and the external electrode fluorescent lamps.

8. The back light module of claim 7, wherein the diffusion plate is fixed to the frame.

* * * * *